Aug. 22, 1939.    M. C. PUTNAM    2,170,462
CLAMP NAIL AND PROCESS OF MAKING SAME
Filed June 11, 1936
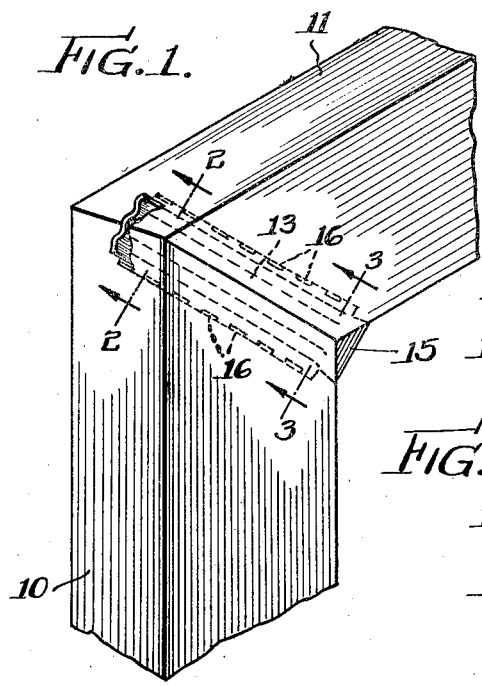
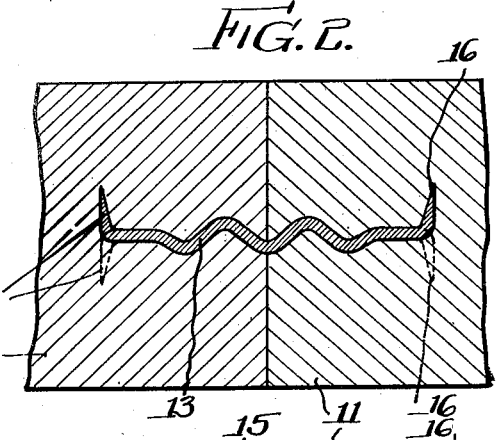
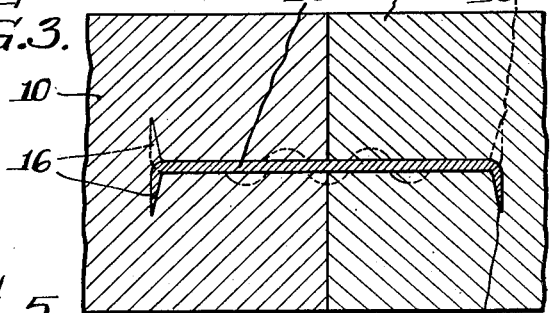
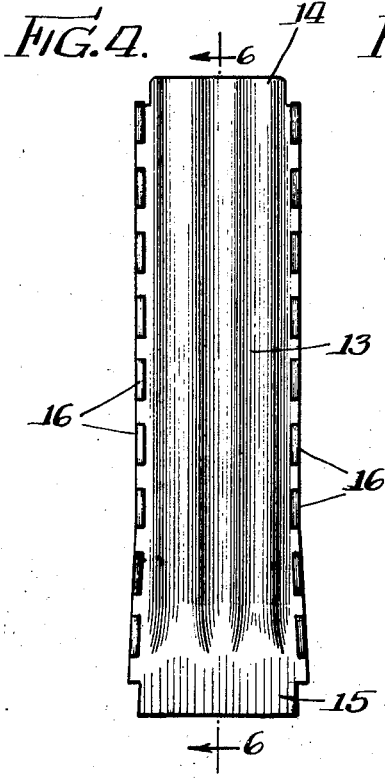
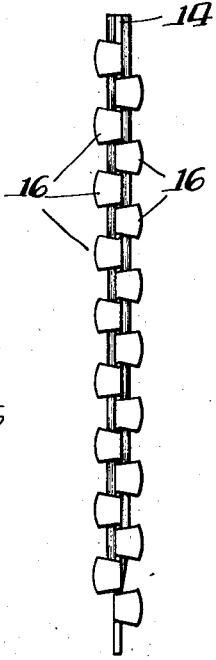
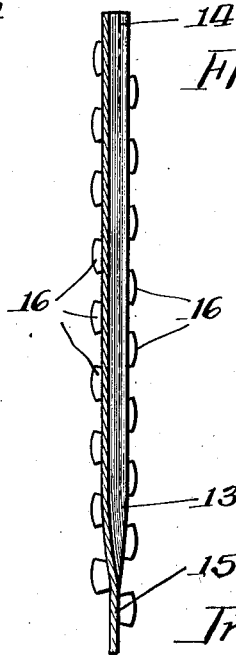
Inventor:
Mabel C. Putnam
By:- Cox & Moore attys.

Patented Aug. 22, 1939

2,170,462

UNITED STATES PATENT OFFICE 2,170,462

CLAMP NAIL AND PROCESS OF MAKING SAME

Mabel C. Putnam, Chicago, Ill., assignor to Clamp Nail Company, Chicago, Ill., a corporation of Illinois Application June 11, 1936, Serial No. 84,658

9 Claims. (Cl. 10—34)

The present invention relates to a dowel and has to do particularly with a flanged longitudinally corrugated joint fastener. The articles that are fastened together are generally angularly disposed. Such articles may be normal to another or there may be a mitered joint therebetween.

One of the objects of the invention is the provision of an improved dowel combining the advantages of a longitudinally corrugated web, discontinuous staggered flanges, and a driving tongue generally narrower than such flanges and frequently of less width than the web.

A secondary object of the invention is the provision of a new and improved type of dowel combining a longitudinally corrugated web with oppositely staggered flanges.

Another object of the invention is the provision of an unique dowel having discontinuous flanges allowing the material into which the dowel is driven to spread transversely of the flanges to resist retraction of the dowel from such material.

Still another object of the invention is the provision of an improved dowel formed of a single piece of light stiff sheet metal corrugated for re-enforcement and having discontinuous flanges struck laterally and oppositely from the web of such a dowel and preferably in equal number and size.

Still another object of the invention is provision of a dowel of the character hereinabove described and having a sharpened driven tongue the edge of which may be of a number of selected shapes.

Still another object of the invention is the provision of a metal nail of elongated character having opposed longitudinally extending flanges along its opposite side, wherein the body of the fastener is provided with longitudinal corrugations not only to strengthen the body of the fastener, but to aid in the fastening function, and wherein the corrugations at the entering end of the fastener are flattened out not only to facilitate entering, but also to provide a flaring effect at the entering end of the fastener.

Still another object of my invention is to provide a process for forming a sheet metal longitudinally corrugated clamp nail or fastener having a flared entering end, wherein the flaring is produced by flattening out the corrugations at the entering end, whereby also to give the pilot end or tongue a substantially straight line entering edge.

With the above and other desirable objects in view, the invention is hereinafter set forth with reference to a single sheet of drawing attached hereto and hereby made a part of this specification, and upon which:

Fig. 1 is a perspective view of an L-joint in which an embodiment of the invention is shown in dotted lines;

Fig. 2 is an enlarged transverse section taken on the line 2—2 of Fig. 1;

Fig. 3 is an enlarged transverse section taken on the line 3—3 of Fig. 1;

Fig. 4 is a side elevation of the dowel illustrated in Fig. 1;

Fig. 5 is a side view of Fig. 4; and

Fig. 6 is a section on the line 6—6 of Fig. 4.

Like reference characters are used to designate similar parts in the drawing and in the description that follows.

There is shown in Fig. 1 of the drawing illustrating one embodiment of the present invention, part of a frame. Such part comprises a side member 10 and a transverse member 11 abutting the side member 10 at an angle. Members 10 and 11 are joined by a joint fastener, clamp nail or dowel forming the present invention.

The dowel has substantially an I beam cross section as shown in Fig. 2. It is formed of an integral piece of thin stiff material, preferably sheet metal, having a longitudinally corrugated elongated web 13. The dowel has a driving end 14 the edge of which is generally of less width than the body of the web 13.

The entering end of the dowel has a centrally located tongue or pilot 15. The tongue 15 is parallel to and integral and continuous with the web 13. The width of the tongue generally is preferably less than the maximum width of the web 13. The tongue 15 may have a sharpened or tapered edge if this is desired, but this is not necessary.

Discontinuous flanges comprising a plurality of oppositely staggered tabs, flanges or wings 16 are arranged at the side edges of the web 13 and extend in parallelism from the driving end 14 to a part spaced from the base of the tongue 15. When viewed from the side (Fig. 5), the dowel has the general appearance of a herringbone. The tabs 16 are tapered or may be sharpened to form cutting edges normal to the plane of the web 13.

The driven end of the dowel or tongue 15 is forced into saw kerfs in the members 10 and 11. One-half of the dowel viewed longitudinally enters each frame member 10 and 11. By applying force to the driving end 14 of the dowel, the dowel is forced inwardly of the saw kerfs in the frame members 10 and 11. The saw kerfs are generally of a uniform depth slightly greater than one-half of the width of the web 13.

When the dowel is driven until fully within the material of members 10 and 11, the material of such members being fibrous and resilient, flows between the discontinuous flanges 16. The expansion of the wood between adjacent flanges tends to retard the retraction of the dowel. The corrugations in web 13 re-enforce the material thereof permitting of the use of light material. Flanges 16 with the aid of the corrugated web 13 maintain the members 10 and 11 firmly joined one to another. The corrugations in the web 13 give to the web a depth greater than the saw kerf into which the dowel is seated. A deformation of both material and dowel necessarily results when the dowel is inserted. Such deformation produces a tight and secure joint without undue destruction of the fibre of the material.

The fasteners or dowels may be made up of an exceedingly hard and tough metal that is just sufficiently soft to take the cross bend of the various serrations shown. The tabs 16 may be made any width and length and may be rounded or pointed, depending upon the strength required for the work for which the fastener or dowel is designed.

Other forms of corrugations may be substituted for those shown. Longitudinal corrugations permit of the use of a much lighter material. The corrugated fasteners have more strength than straight fasteners or clamp nails such as are conventionally used today. Corrugations as herein shown approximately double the number of fasteners or nails that may be made out of a pound of material over the number that may be made of the present day type of clamp nails.

The driven or entering end of the fastener is flattened out as shown to permit of its free entry into virgin wood or into a saw kerf. The driving end of the fastener may be straight across as shown in Fig. 4 or may be serrated. It will also be noted that when the corrugations are flattened out at the entering or driven end of the fastener or dowel, as represented at 15, the flattening out of these corrugations tends to spread or flare the entering end so as to produce a wedging or drawing together effect of the joint as the fastener enters the kerf. This is due to the fact that the metal of the corrugations, when the corrugations are flattened, will tend to spread out laterally and flare the flanges outwardly, as indicated at the bottom of Fig. 4. By flaring these flanges outwardly at the entering or driven end of the fastener, as the fastener enters the kerfs the upper narrower portion of the fastener between the opposed flanges 16 will tend to draw together the two pieces of material forming the joint.

The inner faces of the tabs 16 may be straight and at right angles to the plane of the body of the fastener. The fact that such serrations have a straight inner face assures that the fastener will take a perfect hold when driven into virgin wood or into a saw kerf. These tabs 16 after being driven into the wood, will imbed themselves more tightly in the wood the longer the fastener remains in the wood and will prevent the joint from ever becoming loose and opening up.

The tabs 16 may alternate from side to side. Each tooth cuts its own way into the wood or saw kerf. This permits of easy driving.

Such a fastener or nail as is shown possesses a two-fold holding quality—the corrugations and/or the tabs 16. Tabs 16 may be manufactured with less pressure to produce a sharp point at the outer edge than it would require to bring up a continuous ridge or flange to a sharp point.

Fig. 4 illustrates a corrugated web having a flat tongue which may be blunt or sharpened as desired. If desired, the web may have a convex edged tongue which may be flat, and either blunt or sharpened. If preferred, this tongue may be corrugated like the web.

The driving ends may be varied; they may be straight across, concave, or convex, or triangular. The driving tongues generally are of less width than the webs with which they are integral and are of the same thickness as such webs.

It is apparent that the fastener may have any driving tongue or driven tongue that has been described or illustrated, the combination being to meet the specific requirements in hand.

Changes may be made in the form, construction and arrangement of parts without departing from the spirit of the invention or sacrificing any of its advantages, and the right is hereby reserved to make all such changes as fairly fall within the scope of the following claims.

What is claimed as new and is desired to be secured by Letters Patent of the United States is:

1. A fastener comprising an elongated web having parallel, discontinuous tabs extending laterally adjacent the side margins of said web, each of said tabs extending longitudinally along said margins and increasing in longitudinal width in a direction outwardly from the web.

2. A fastener comprising an elongated blank of sheet metal to provide a web portion and parallel, discontinuous flanges, said web portion being formed with longitudinally extending corrugations, the corrugations at the entering end of the blank being flattened out to provide a substantially straight edge, tongue or pilot extending beyond said flanges.

3. A sheet metal fastener of substantially elongated, rectangular shape formed with corrugations extending longitudinally thereof, the opposed, longitudinal edges of said fastener being formed with parallel, discontinuous tabs arranged in planes extending longitudinally with respect to said edges and projecting laterally from the fastener, each of said tabs increasing in longitudinal width as it extends outwardly from the fastener, the corrugations at the entering end of the fastener being flattened out whereby to provide a flared entering end for the fastener.

4. A fastener comprising an elongated, rectangular blank of sheet metal formed with longitudinal corrugations, the longitudinal, opposed edges of the blank being provided with laterally extending tabs forming discontinuous flanges, each of said tabs being arranged in planes extending longitudinally with respect to said edges and increasing in longitudinal width in a direction outwardly from the fastener, the flanges at one end of the blank terminating short of the end thereof to provide a tongue or pilot, the corrugations at said tongue or pilot being flattened out.

5. A fastener comprising a web having parallel integral flanges, the body of said web being corrugated parallel to a part of the length of said flanges and the corrugations therein giving to said body a thickness greater than the width of a saw kerf in which the fastener is to be used, each of said flanges of said web being formed of tabs of substantially uniform size and shape extending alternately in opposite directions, the driven end of said fastener being free from tabs and being of slightly less width but of the same thickness in cross section as the said web.

6. The fastener described in claim 5, and in which the driven end of the fastener comprises a sharp tongue.

7. The process of forming a fastener which comprises providing a substantially elongated sheet metal blank with longitudinally extending corrugations, forming the edges of the blank with outstanding flanges and flattening the corrugations on the blank at one end whereby to taper the web and flanges at said end.

8. The process of producing a sheet metal fastener having longitudinally extending corrugations and opposed outstanding flanges along its elongated edges, which comprises flattening the longitudinal corrugations of such a blank at one end whereby to flare the web and flanges at such end leaving the end of the blank substantially flat and the remainder of the blank corrugated.

9. A sheet metal fastener comprising an elongated web of substantially rectangular shape having substantially parallel side edges, said side edges being formed with laterally extending tabs providing discontinuous flanges, each of said tabs terminating outwardly in a curved edge, the central portion of the curved edge being at the greatest distance from the web, the extremities of said edge gradually approaching the said web.

MABEL C. PUTNAM.